United States Patent [19]

Kulberg

[11] Patent Number: 5,734,716
[45] Date of Patent: Mar. 31, 1998

[54] MAGNETICALLY DRIVEN VERTICALLY CORRECTING ANTENNA FOR PORTABLE TELEPHONES

[75] Inventor: Eric C. Kulberg, San Diego, Calif.

[73] Assignee: QUALCOMM Incorporated, San Diego, Calif.

[21] Appl. No.: 536,024

[22] Filed: Sep. 29, 1995

[51] Int. Cl.⁶ .................... H04M 1/00; H04B 1/38
[52] U.S. Cl. .................. 379/433; 379/428; 379/434; 455/90
[58] Field of Search ..................... 379/428, 433, 379/434, 58; 343/702; 455/89, 90; D14/137, 138

[56] References Cited

U.S. PATENT DOCUMENTS

| | | |
|---|---|---|
| 3,742,358 | 6/1973 | Cesaro . |
| 4,001,830 | 1/1977 | Ishimaru et al. ............ 343/702 |
| 5,045,971 | 9/1991 | Ono et al. ................. 361/386 |
| 5,120,135 | 6/1992 | Ullman ..................... 366/273 |
| 5,228,339 | 7/1993 | Maresca, Jr. et al. ........ 73/290 |
| 5,440,315 | 8/1995 | Wright et al. .............. 343/702 |
| 5,506,593 | 4/1996 | Peng ....................... 343/888 |
| 5,523,766 | 6/1996 | Erceg ...................... 343/702 |
| 5,535,435 | 7/1996 | Balzano et al. ............. 455/89 |

FOREIGN PATENT DOCUMENTS

| | | | |
|---|---|---|---|
| 0611199 | 8/1994 | European Pat. Off. | H04B 1/38 |
| 0652646 | 5/1995 | European Pat. Off. | H04B 1/38 |
| 0694985 | 1/1996 | European Pat. Off. | H01Q 1/24 |
| 4001243 | 7/1991 | Germany | G02B 26/10 |

Primary Examiner—Krista Zele
Assistant Examiner—Allan Hoosain
Attorney, Agent, or Firm—Russell B. Miller; Gregory D. Ogrod

[57] ABSTRACT

A wireless portable phone handset for use in satellite communication systems having a vertically correcting antenna module pivotally secured to the handset for free rotation about a pivot axis. The antenna module contains a magnetic actuator mechanism for urging the module to pivot into a predetermined vertical orientation regardless of the handset orientation. An antenna projects from the module in a direction which is vertically upright when the module is in its predetermined vertical orientation. As the handset is moved into an angular orientation, the module pivots under influence of gravity, and a magnetic field from a magnetic driver, until the antenna is oriented vertically.

19 Claims, 5 Drawing Sheets

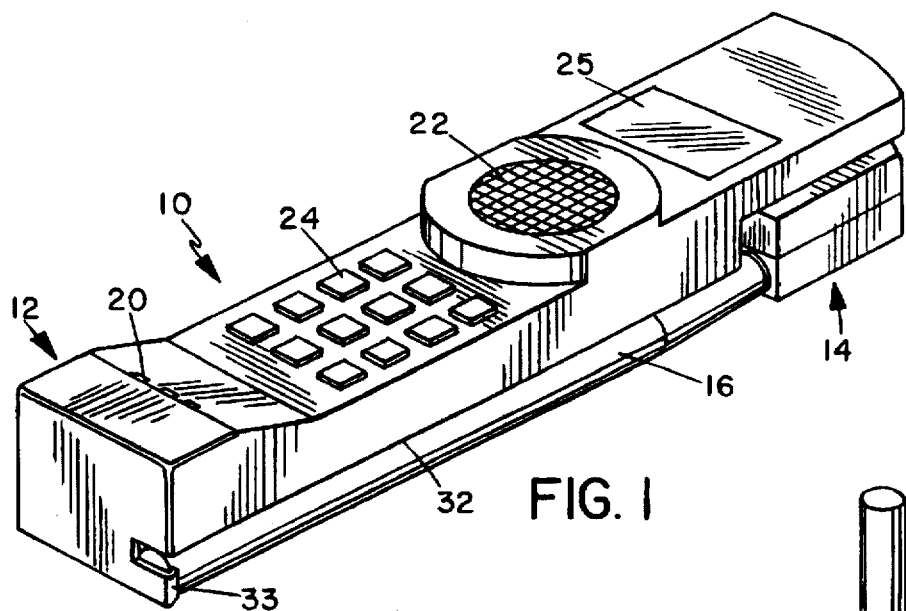
FIG. 1
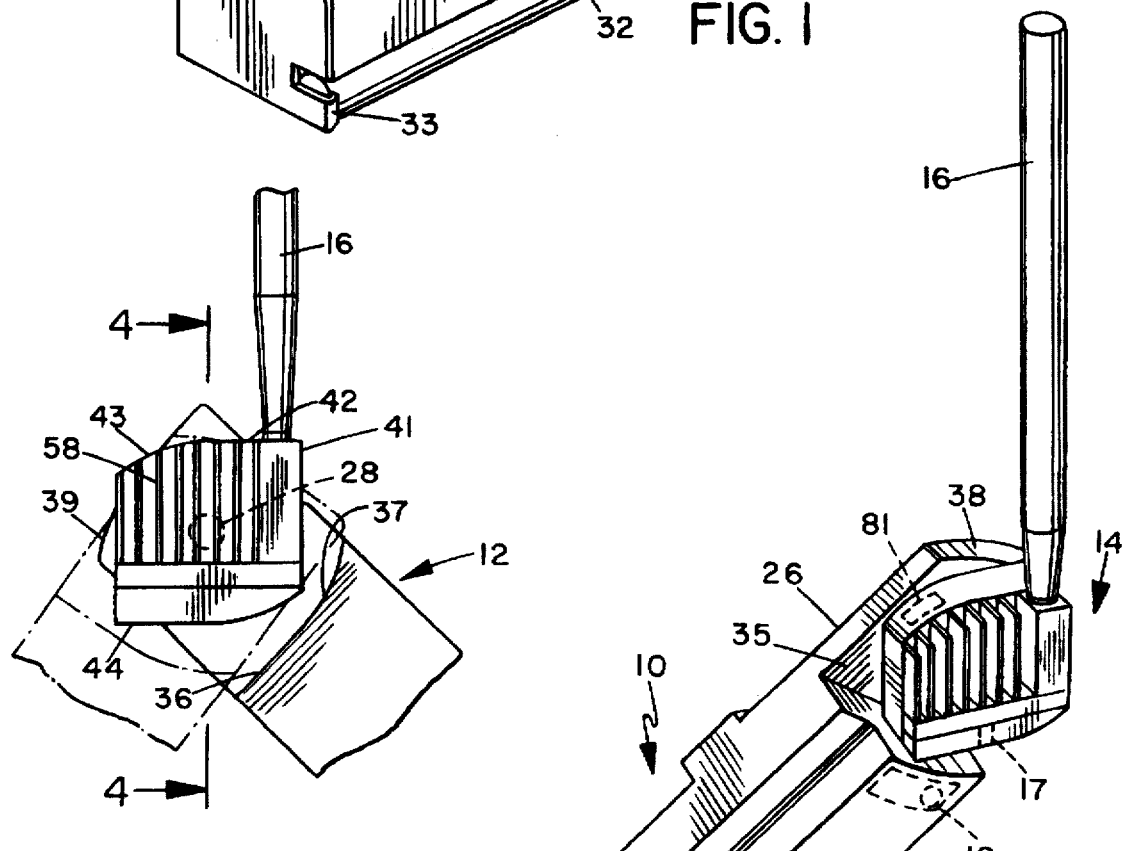
FIG. 3
FIG. 2

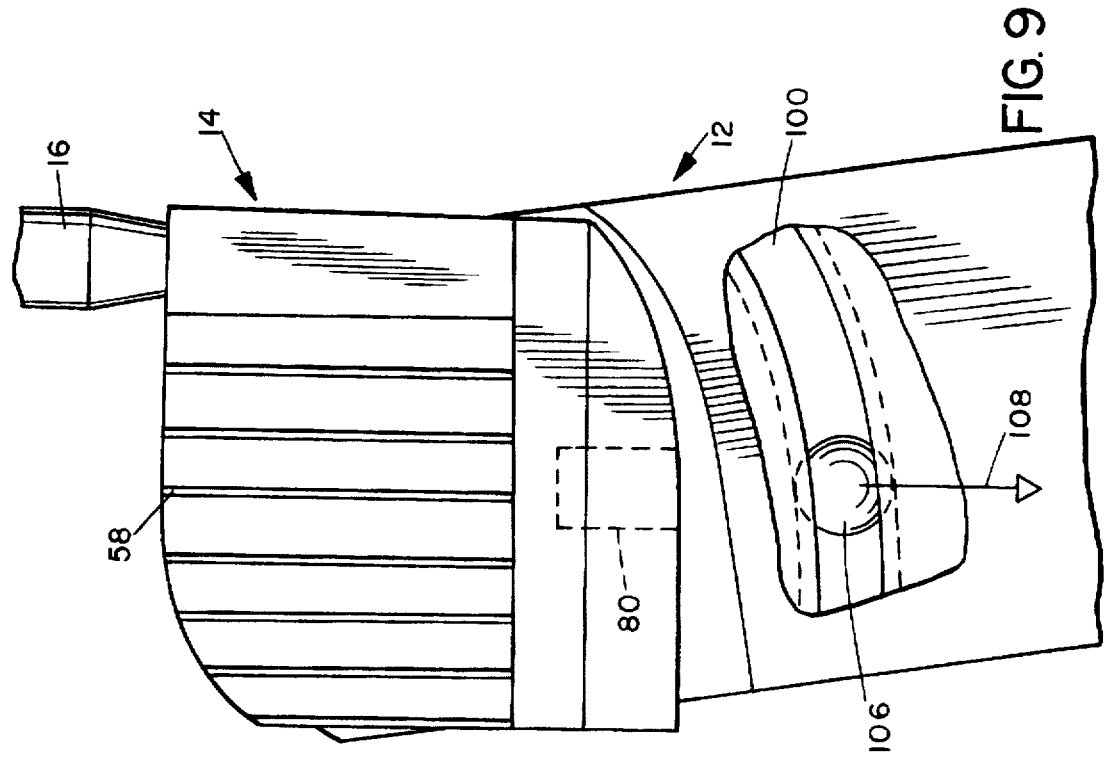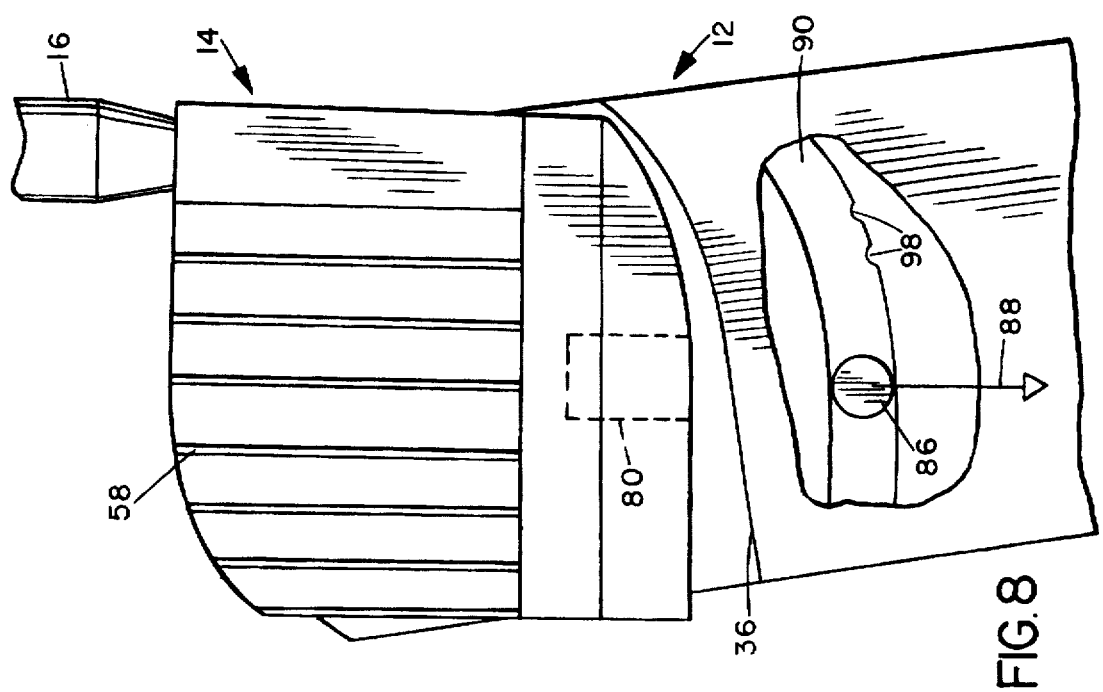

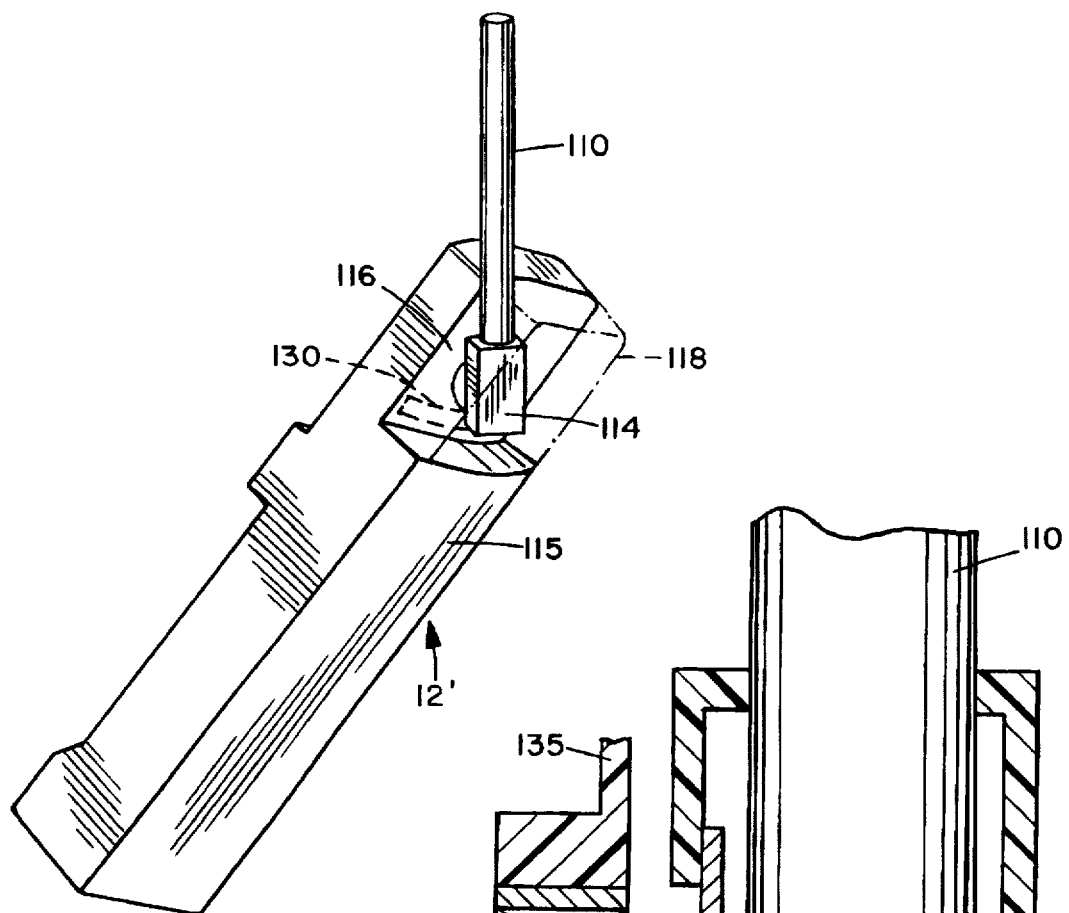
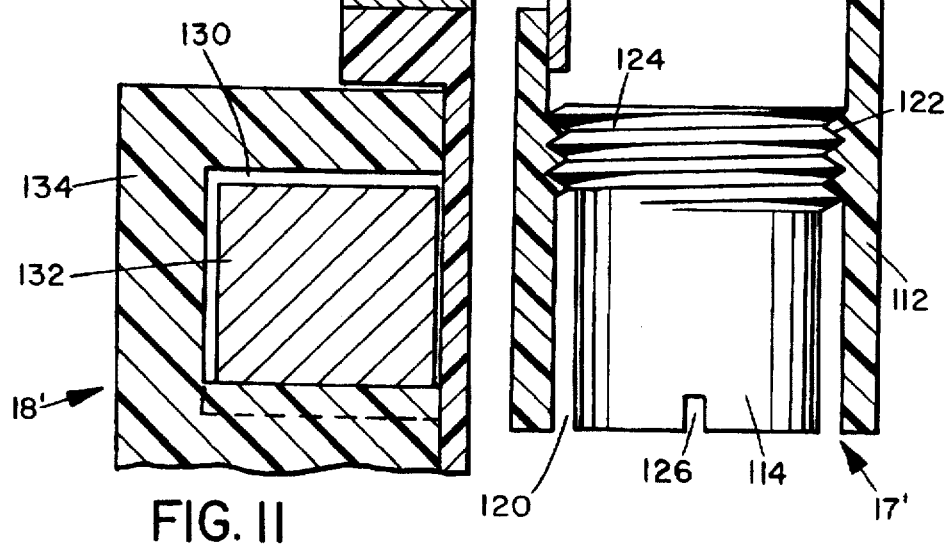

MAGNETICALLY DRIVEN VERTICALLY CORRECTING ANTENNA FOR PORTABLE TELEPHONES

RELATED APPLICATIONS

This application is related to a commonly owned application Ser. No. 08/532,920, filed on Sep. 22, 1995, entitled "Vertically Correcting Antenna For Portable Telephone Handsets", the full disclosure of which is incorporated herein by reference as if reproduced in full below.

BACKGROUND OF THE INVENTION

I. Field of the Invention

The present invention relates generally to satellite communications and more particularly to portable or handheld telephone units used for wireless communications using communication satellites. The invention is further related to a method and apparatus for automatically vertically correcting antennas for use on wireless telephones to affect more efficient signal transfer.

II. Description of the Related Art

In terrestrial based wireless or cellular telephone systems, communication signals are transferred to and from system users using fixed base stations, also referred to as cell sites, each covering a specific geographical area. In satellite based communication systems, the same signals are transferred between system users and gateways using orbiting satellites. Satellites are generally used to provide service over fairly large geographic areas in large scale communication systems that provide communications between widely dispersed fixed and mobile users or subscriber units. Such systems are described, for example, in U.S. Pat. No. 4,901,307, which issued Feb. 13, 1990 under the title "Spread Spectrum Multiple Access Communication System Using Satellite Or Terrestrial Repeaters", and U.S. patent application Ser. No. 08/368,570, filed under the title "Method And Apparatus For Using Full Spectrum Transmitted Power In A Spread Spectrum Communication System For Tracking Individual Recipient Phase Time And Energy," which are both assigned to the assignee of the present invention, and incorporated herein by reference.

Subscriber units using telephone style handsets in such systems, typically have a microphone, an earphone or speaker, internally mounted components for receiving, processing, and transmitting radio frequency signals, and an external antenna. The internal circuitry is suitably linked to the microphone, speaker and external antenna in a manner well known in the field. The antenna tends to be quite specialized in terms of operating frequencies and radiation patterns, and orientation of the antenna can be quite important for proper signal communication with a satellite.

Antennas for use in satellite communication systems have radiation patterns that should be directed substantially upward from a local horizontal plane or horizon to efficiently couple energy to or from satellites. If a handset is held in an orientation in which the antenna is not vertical, or is rotated to a non-vertical orientation during use, the radiation pattern (local horizon) is also positioned at an angle to the horizon. In this position, communication may be lost or severely degraded as the radiation pattern no longer covers some satellite positions, or aligns a lower energy portion with others, decreasing energy transfer. Depending on the angle of the handset, even communications with satellites at fairly high elevations could suffer.

To compensate for this effect, antennas can be designed with radiation patterns that extend below the local antenna horizon. That is, the radiation pattern extends below a horizon for the antenna so that some off vertical positioning of the handset still places satellites within a desired portion of the radiation pattern. Unfortunately, this type of antenna design is less efficient in transferring signal energy even when aligned vertically and positioned optimally with respect to satellite positions. At the same time, disruption of service still results when the handset is rotated sufficiently, unless the radiation pattern extends an excessive amount below the horizon.

A new antenna direction mechanism is desired that compensates for handset motion during use without undue complexity.

SUMMARY OF THE INVENTION

It is an object of the present invention to provide a portable or handheld wireless telephone handset with a vertically correcting antenna.

An advantage of the invention is that the antenna can more efficiently couple energy with satellite communication links with a minimum of user interaction.

These and other purposes, advantages, and objects are realized in a wireless portable telephone unit which has a telephone handset with a microphone and speaker or earphone, and an antenna module pivotally secured to one portion for rotation relative to the handset about a preselected pivot axis. The pivot axis extends transverse to a front wall of the housing, in an orientation which will normally be at or close to horizontal when the handset is placed in a customary position of use. An antenna projects in a first pointing direction from a first location on the antenna module. A gravitationally sensitive magnetic drive mechanism or driving means is provided for causing the antenna module to rotate so as to direct the opposite side of the module from the antenna into a lowermost position as the handset is rotated during use. Therefore, the antenna is automatically maintained in a vertical position during use of the telephone.

In a preferred embodiment, at least one magnetic actuator or block of magnetically attracted material is provided on an opposite side of the module from the antenna, for influencing that portion of the module to move or align itself in an opposite direction to the antenna pointing direction. A gravitationally sensitive magnetic driver is positioned on the handset adjacent to the antenna module and interacts with the magnetic actuator to rotate the module. These two components form a gravitationally sensitive magnetic driving means or rotating mechanism. With this arrangement, when a user places the handset adjacent to their head at an appropriate angle of use, the magnetic rotating mechanism rotates the module into a predetermined orientation in which the magnetic actuator is lowermost, and the antenna is oriented vertically. The magnetic actuator interacts with the magnetic driver to continually adjust the antenna position as the handset is moved, with the module rotating freely about the pivot axis as the magnetic actuator is urged by the magnetic driver into a lowermost position.

In a preferred embodiment, the magnetic actuator is manufactured using a magneto-attractive or ferromagnetic material, such as steel, nickel, or other known metallic substances. Alternatively, a powder or other form of metallic material dispersed in an organic binder, or plastic or ceramic material can be used for economy of manufacture or to obtain special shapes. The magnetic actuator generally has a small cylindrical or rod shaped body, and forms a plug like element that is mounted within a passage or recess in the antenna module. Other shapes can be used within the teachings of the invention depending on such known factors as available volume, configuration, and location for mounting on the antenna module.

The magnetic body is held in position using means such as set screws, adhesives, threaded fittings, and clips or rings. The passage is typically formed as a recess or depression in an exterior wall of the module, and is deep enough and appropriately dimensioned to contain the rod, or other shaped body, flush or below exterior surfaces. In the alternative, the magnetic actuator is mounted within an internal compartment for the antenna module. In addition, a second magneto-attractive body can be mounted on the opposite side of the antenna module for use when the antenna is in a closed or inoperative position.

In the preferred embodiment, the magnetic driver comprises a magnetized cylindrical body or rod mounted in a curved track within a lower portion of the handset housing below or behind the antenna module. The track extends in an arc across the handset, substantially perpendicular to the axis of rotation for the antenna module, and generally centered about the pivot axis with raised ends and a low point in the middle relative to a lower wall of the phone.

The track has a rectangular cross section with dimensions that are slightly larger than those of the rod, and there is one position along the track that is the single lowest point at any time, which is generally centered under the axis of rotation for antenna module. The track can be manufactured by using multiple spaced apart or joined together blocks having grooves formed in surfaces that face each other. The grooves act to form the overall track. In the alternative, a single block can be used in which a curved track is machined. These blocks are secured in the handset housing using one of several known mechanisms.

The force of gravity acts on the magnetized rod and it moves or rolls to the lowest position in the track. As the rod moves to this, or any other, position, the magnetic actuator is attracted to the rod and tries to align itself close to or positioned above the rod. This means that the antenna module rotates to maintain the magnetic actuator in close proximity to the rod. This movement in turn results in the module maintaining a substantially vertical alignment as the telephone handset is rotated, and the rod moves along the track.

In further aspects of the invention, the magnetic driver is manufactured in other shapes, such as that of a sphere. The magnetic driver can also be manufactured from ferromagnetic material and the magnetic actuator can then be manufactured from magnetized material. In addition, both the magnetic driver and actuator can be formed from magnetic material.

The handset preferably comprises a generally rectangular housing having a front wall in which the mouthpiece and speaker are located, and rear, upper, lower, and spaced apart side walls. The front wall may also have a keypad and a visual display unit. The antenna module is preferably pivotally mounted on the rear wall of the housing, and a recess may be provided in the rear wall adjacent to an upper end of the housing for mounting the antenna module. The antenna module is preferably shaped to fit into the recess with its outer surfaces substantially flush with the adjacent surfaces of the handset housing when the antenna is rotated into an inoperative, stored, position adjacent to or within the general outline of the handset. A recess may also be provided for receiving the antenna in the stored position. During use of the handset, the antenna module rotates freely about the pivot axis as the handset is moved into non-vertical orientations.

The antenna module may also include an internal cavity for mounting RF components and suitable wiring or cables extending through a pivot connection to link the RF components and antenna to other circuitry within the handset. This type of mounting in close proximity to the antenna, allows efficient energy transfer and antenna performance. Additionally, the antenna module may be designed to have greater heat transmission characteristics than the handset, by using heat transferring fins, for example, to increase heat dissipation for components mounted in the antenna module, reducing the likelihood of overheating or undesirable temperatures.

The pivot axis extends transversely to the front wall of the housing, in an orientation which will normally be at or close to horizontal when the phone unit is in use, regardless of the orientation or angle of the handset itself. The pivotal mounting of the antenna with a magnetic actuator insures that the antenna seeks a vertical orientation regardless of the actual phone orientation, reducing the risk of signal loss as a result of improper antenna orientation. The phone user does not have to orient the antenna, but the antenna module rotates freely into a proper vertical orientation under the influence of the magnetic actuator which constantly seeks to align itself with a magnetic field provided by the magnetic driver. The magnetic driver in turn aligns the field according to the influence of gravity. Thus, the magnetic actuator maintains the antenna in a more optimal, vertical orientation for acceptable antenna reception and transmission.

The portable telephone unit may be designed for satellite communications only, or may be usable in other wireless applications such as in conventional cellular systems, and may have an additional, built-in cellular antenna.

At the same time, due to the assurance of a reasonably vertical orientation for an antenna mounted according to the invention, the radiation pattern of the antenna can be optimized to have a more vertical pattern with more efficient signal energy transfer or coupling, improving communications.

BRIEF DESCRIPTION OF THE DRAWINGS

The present invention will be better understood from the following detailed description of a preferred embodiment of the invention, taken in conjunction with the accompanying drawings, in which like reference numerals refer to like parts, and in which:

FIG. 1 illustrates a perspective view of a portable telephone according to a preferred embodiment of the invention, with a pivoting antenna in a closed position;

FIG. 2 illustrates a perspective view of the telephone of FIG. 1 in a position of use, with the antenna in a self-sustaining vertical position;

FIG. 3 illustrates a rear view of the telephone of FIG. 1 showing different vertical handset inclinations with the antenna remaining vertical;

FIG. 8 illustrates a cut-away rear view of a telephone showing the magnetic driver of FIG. 4 in use;

FIG. 9 illustrates a cut-away rear view of a telephone showing the magnetic driver of FIG. 7 in use;

FIG. 10 illustrates a perspective view of a portable telephone according to another embodiment, with a pivoting antenna; and FIG. 11 illustrates an enlarged sectional view of the telephone of FIG. 10.

DESCRIPTION OF THE PREFERRED EMBODIMENT

Figure 4:
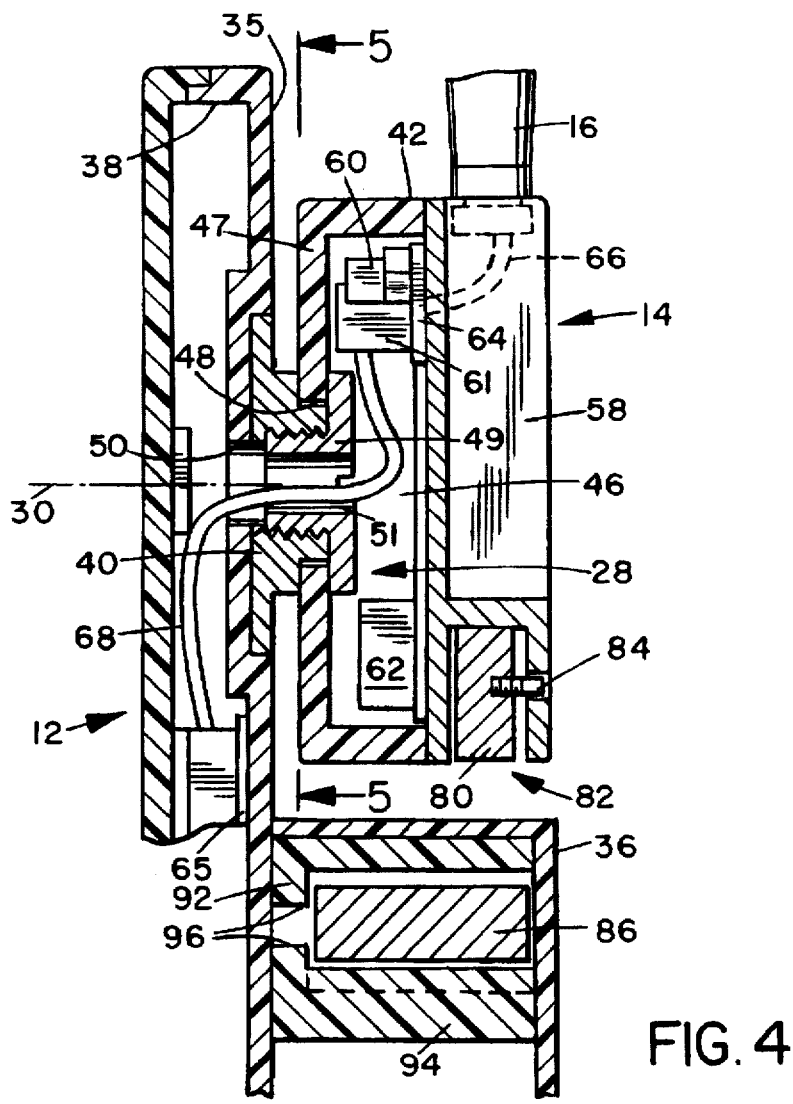
FIG. 4 illustrates an enlarged sectional view taken on line 4—4 of FIG. 3.

The present invention is a technique for automatically orienting an antenna on a portable wireless communications device, such as a handheld telephone, vertically during use to improve the transfer of signal energy with satellite repeaters and gateway type base stations. The invention also allows improved radiation pattern tailoring for the antenna, which further improves communication system performance. The invention achieves these functions by securing an antenna or antenna structure on an antenna module which is rotatably mounted on the communication device. A mechanism is provided that automatically directs a portion of the module opposite the antenna, which is on an uppermost part, to a downward a portable or hand use.

A portable or handheld wireless telephone constructed and operating according to a preferred embodiment of the invention is shown beginning in FIGS. 1-3. In FIGS. 1-3, a portable telephone 10 is illustrated having a handset 12 and an antenna unit or module 14 pivotally mounted on a rear wall 15 of the handset, with an antenna 16 projecting generally upward from module 14. The antenna may be any type of antenna which is conventionally used in satellite communication systems, such as, but not limited to, quadrifilar, stacked quadrifilar, or octafilar helix antennas. Such antennas are discussed further in U.S. patent applications Ser. Nos. 08/513,317 and 08/532,921, entitled "Quadrifilar Helix Antenna And Feed Network" and "Dual-Band Octafilar Helix Antenna", respectfully.

Handset 12 comprises a generally rectangular housing, manufactured from relatively lightweight materials known in the art, such as a lightweight plastic. Module 14 is generally manufactured from similar lightweight materials, although some metallic materials might be used as discussed below for thermal dissipation. Typically, a portion of a front wall surface extends outward toward a user where a microphone 20 is mounted to improve voice pick-up, and surface extensions or depressions may be used to hold a speaker 22 in the front wall of the housing. Such features are illustrated in FIG. 1, along with a conventional keypad 24 and visual display unit 25 used for information input and reception, respectively.

A magnetic actuator 17 is shown in FIG. 2 embedded within a lower portion of module 14 on the opposite side to antenna 16, and a corresponding magnetic driver 18 is also shown mounted within rear wall 15 of handset 12 adjacent to a lower portion of module 14. Magnetic actuator 17 is generally provided in the form of a block of ferromagnetic material, or a magnet, as discussed further below, that interacts with a magnetic field from magnetic driver 18. Magnetic driver 18 interacts with block 17 and urges module 14 to continually seek a predetermined, vertical orientation in which block 17 is lowermost and the antenna points vertically upwards.

Antenna module 14 is shown in FIGS. 2-4 as being pivotally mounted in a recess 26 in rear wall 15 of the handset housing using a pivot joint 28. Pivot joint 28 defines a pivot axis 30 which extends transverse to rear wall 15 of the housing and generally parallel to a central axis of speaker 22 mounted on the front wall, which is generally held against or near a user's ear during use. However, the invention functions equally well when the telephone is rested on a surface well removed from the user's ear. The shape and dimensions of recess 26 substantially match those of antenna module 14, so that in a closed, inoperative, position as shown in FIG. 1, module 14 is substantially flush with the adjacent surfaces of the handset. The housing has an elongated recess 32 extending along one side wall for receiving antenna 16 when not in use, as illustrated in FIG. 1.

A suitable releasable snap or latching device is provided for releasably holding the antenna in recess 32. In the illustrated embodiment, a snap lock finger or latch 33 is provided at the lower end of recess 32. However, in alternative embodiments, a ball and socket type of detent mechanism may be provided between module 14 and recess 26, or other mechanisms known in the art.

Figure 5:
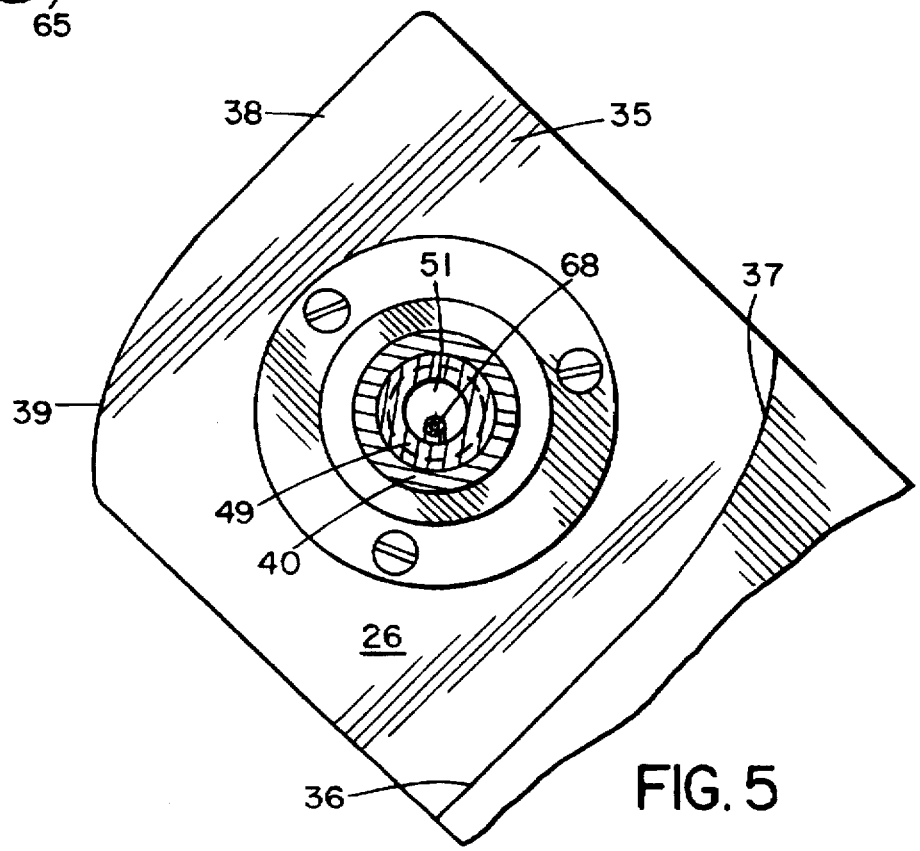
FIG. 5 illustrates a sectional view taken on line 5—5 of FIG. 4.

As mentioned above, antenna module 14 and recess 26 are of substantially matching shape and dimensions. Any shape may be selected which permits antenna module 14 to pivot freely about pivot axis 30 when the antenna is not retained in recess 32. However, the shape of antenna module 14 is preferably selected such that it matches the shape of adjacent surfaces of the handset module for aesthetic reasons. The criteria or techniques for choosing and using specific shapes in designing a handset are generally well understood by designers in the telecommunication arts. Therefore, in the illustrated embodiment, recess 26 is generally square in shape with a flat inner wall 35 and a lower wall 36 having an upwardly curved portion 37 adjacent one side wall. Upper wall 38 of the handset is of similar shape to lower wall 36 of the recess, with a similarly downwardly curved portion 39 positioned adjacent to the side wall opposite to curved portion 37, as best illustrated in FIG. 5. Pivot joint 28 includes a pivot member or pin 40, or a bearing assembly 70, discussed below, which is secured approximately in the center of inner wall 35 of the recess, as illustrated in FIGS. 4 and 5.

Antenna module 14 is also generally square in shape with spaced apart, generally parallel, side walls 41, an upper wall 42 having a curve 43 at one side matching curves 37 and 39, and a lower wall 44 having a curve 45 on the opposite side to curve 43 and also matching curves 37 and 39 in the lower wall of the recess and the upper wall of the handset. Module 14 has an internal cavity 46 and a flat inner wall 47 which has an opening 48 for rotatable engagement over pivot pin 40. The module is rotatably secured on pivot pin 40 by means of a suitable screw fastener 49 or the like, as best illustrated in FIG. 4, or using other known means such as retaining clips or pins. The inner wall of the recess and the pivot joint have aligned through bores 50 and 51, respectively. These bores provide passages between cavity 46 inside the antenna module and a cavity 52 within the main body of the handset. Internal cavity 52 houses various conventional or known electronic components used to manufacture a portable telephone or wireless communications device.

In an exemplary embodiment, outer wall 54 of module 14 and cavity 46 has a plurality of parallel, heat dissipating fins 58 located in a region above magnetic actuator 17, as illustrated in FIG. 2. Fins 58 may be manufactured from a suitable metal having improved heat dissipating properties, such as aluminum or the like, or may be of the same plastic material as typically used to manufacture the remainder of the antenna module, apart from magnetic actuator 17. Antenna 16 is secured to the upper wall of the antenna module facing in the opposite direction to magnetic actuator 17. Antenna 16 can be secured in place using known techniques, such as but not limited to, press fitting, using adhesive compounds, set screws, retaining rings, or threaded surfaces.

Preferably, some of the electronic components used in the handheld telephone are mounted in cavity 46, rather than in handset cavity 52. This is illustrated in FIG. 4 where RF components 60, 61 and 62, which form parts or all of a low noise amplifier, a power amplifier, and other known circuits, are shown mounted on a circuit board 64 within cavity 46. Positioning these components in close proximity to the antenna allows more optimal antenna performance. Additionally, the antenna module can be designed with greater heat transfer characteristics than the phone module, allowing heat generated by the internal components to be dissipated more readily. Other components for controlling and operating the phone are mounted in handset cavity 52 on a circuit board 65, in a conventional manner. The antenna is connected to the components in cavity 46 through a coaxial cable 66, and the RF components in cavity 46 are connected by cable 68 extending through bores 50 and 51 to the components in handset cavity 52.

To further control or limit the motion of antenna module 14 and antenna 16 during use when handset 12 is moved rapidly, a damped bearing assembly, or damping mechanism, can be used for pivot member 40. Such damping provides rotational resistance to decrease response time to outside forces, preventing brief variations in handset position, such as resulting from jarring, from quickly disturbing a generally vertical antenna orientation. Typically, such motions are only minor temporary disturbances in handset position, which is rapidly restored to an original position. Allowing too responsive an antenna module rotation places the antenna out of position when the handset is quickly returned to an appropriate usage position. In addition, small positional variations or vibrations, might create an oscillatory motion in the antenna if left undamped, causing swaying, which is deleterious to phone operation.

Figure 6:
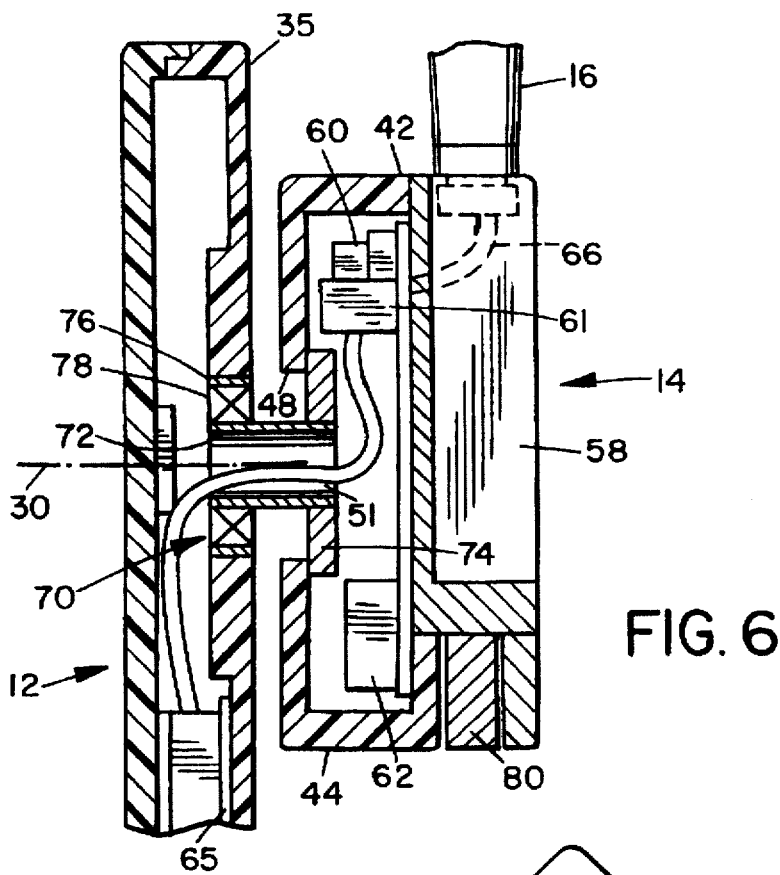
FIG. 6 illustrates an alternative embodiment for the sectional view of FIG. 5.

An exemplary damped bearing assembly is illustrated in the detailed cross section illustrated in FIG. 6, which is the same as the view of FIG. 4 with the exception of a bearing assembly 70 replacing pivot pin 40, and a few numbers being omitted for clarity in illustration. In FIG. 6, bearing assembly 70 is mounted on flat inner wall 35 using known techniques such as, but not limited to, press fitting, or a flange and screw assembly. Bearing assembly 70 has an inner cylindrical support wall or race 72 that extends outward from inner wall 35, through opening 48, and is shown with a flange 74 for securing to antenna module 14. This is accomplished for example by using small screws extending through flange 74 into one of parallel side walls 41. The screws and flange could be accessed when electronic devices are mounted inside of antenna module 14. Alternatively, other flange and screw arrangements, a variety of adhesives, potting compounds, or retaining rings, clips, and detents can be used to secure the antenna module on race 72, as would be apparent to those skilled in the art. Inner race 72, along with an outer race 76, and a bearing unit 78, form a complete damped bearing assembly 70. An external damping member such as a fibrous pad (not shown) pressing against a portion of race 72 could also be used to damp rotary motion, as desired.

The method of creating or exerting a rotational force on antenna module 14 in response to the influence of gravity is illustrated in more detail in FIGS. 4 through 10. In this approach, a magnetic field is used to either augment or replace the function of any counterweights that might be used, as discussed in the patent referenced above. In this configuration, a magnetic field is used to attract a ferromagnetic material mounted in antenna module 14 as magnetic actuator 17, to a magnetized body or material acting as magnetic driver 18. By mounting the magnetized body in such a way that it is substantially free to move and seek a gravitationally 'lower' position as the handset is rotated, antenna module 14 also rotates to center the ferromagnetic material over the magnet which then maintains a substantially vertical position.

This technique is realized as shown in FIGS. 2 and 4, where antenna module 14 is shown with a small metallic rod, body, or plug 80 of ferromagnetic material inserted into a lower portion of antenna module 14, generally along a back edge. However, the actual position can be varied, as would be known to those skilled in the art, according to configurations of the circuitry within module 14 and manufacturing convenience. The plug is of suitable shape and dimensions for a flush fit in a recess or passage 82 with its outer surfaces flush with the adjacent surfaces of the module, as also illustrated in FIGS. 1 and 2. Another option which may provide improved surface conformity or aesthetics, is to form a cavity inside module 14 for receiving plug 80. In this configuration, plug 80 could be installed when circuit elements are mounted inside of module 14.

Magnetic plug 80 can be manufactured from a number of known materials that are highly attracted by magnetic fields, such as but not limited to steel, nickel or other metallic substances. It is also possible to use a powder or other form of metallic material dispersed in an organic binder or plastic material, such as a resin, or even a ceramic base, to form plug 80. Such materials could decrease weight or cost, and allow manufacturing flexibility. In this embodiment, the material used to form heat radiating fins 58 may be a non-magnetic material such as plastic or aluminum, to decrease interaction with magnetic fields, which might interfere with antenna module 14 rotation. Alternatively, some of the centrally located fins could be made from the ferromagnetic material, to serve two functions.

Magnetic plug 80 is shown being held within a passage 82 in antenna module 14 using a set screw 84 in FIG. 4, and by press fitting in FIG. 6. However, other known means, such as but not limited to, an adhesive material, threaded end and matching module threaded receptacle, clip rings in grooves, or flexible detents can be employed, as desired. While the material forming plug 80 is attracted by magnetic fields, it is often less desirable that it be magnetic itself, because in some handset configurations designers may resist placing magnetized material close to circuits and antenna feeds. Therefore, it will depend on the location of certain circuitry, as known in the art, as to whether plug 80 or the magnetic driver is manufactured from magnetized material.

As shown in FIGS. 4 and 8, a magnetized cylindrical body or rod 86 is mounted within a lower portion of the handset housing below lower wall 36 of recess 25, that extends just below antenna module 14. Rod 86 is positioned in a curved track 90 that extends in an arc or arcuate shape across a portion of the housing of handset 12 between the side walls. Track 90 is formed so that it is higher on each end and lower in the middle, relative to a lower wall of the phone. In this fashion, the track extends along the circumference of a circle which is substantially perpendicular to the axis of rotation for antenna module 14 or the rotation of handset 12. Track 90 forms an arc about the axis of antenna module pivot joint 28 or pivot member 40, but this arc need not be perfectly circular. When the track curves in this manner, there is one position along the track that is the single lowest point at any time, and it is generally centered under the axis of rotation for antenna module 14.

When the phone is in use, the force of gravity acts on magnetized rod 86, as indicated by force arrow 88, and it moves or rolls to the lowest position in track 90. This is illustrated in the cut-away view of FIG. 8 where rod 86 is seen resting toward the left end of track 90. As rod 86 moves to this, or any other, position, plug 80 is attracted to rod 86 and tries to align itself close to or positioned above rod 86. This means that antenna module 14 rotates to maintain plug 80 in close proximity to rod 86. This movement in turn results in module 14 maintaining a substantially vertical alignment as the telephone handset is rotated and the rod moves along track 90.

Track 90 can be manufactured in several ways, one of which is illustrated in FIGS. 4 and 8. Here, track 90 is manufactured using an upper block 92 and a lower block 94 which are positioned adjacent to, but spaced apart, from each other in the lower handset housing. Each block has a groove 96 formed in a surface that faces the other block, with the lower block 92 surface having an arch in one direction and upper block 94 surface arching in a parallel and mating direction. Track 90 has a square cross section which can have dimensions, width and height, very close to that of rod 86. However, care is taken to manufacture the blocks with dimensions sufficiently large to assure freedom of motion for rod 86.

Upper and lower track blocks 92 and 94 are secured in the handset housing using one of several known mechanisms such as adhesive compounds, screws or detents. In an alternative embodiment, upper and lower blocks 92 and 94 are joined together without spaces or offsets to form a single block, or such a curved track is machined in a solid block using one or more cutting tools. This single block is then mounted within the telephone handset.

While freedom of motion for rod 86 assures operation, it may not always be desirable to allow the rod to move too freely, since small jarring motions could cause the antenna to move undesirably. While the damping action of bearing 70 can generally accommodate this problem, the track can also be modified to assist. Here, small ridges 98 are formed on one or both surfaces of track 90. This effectively quantizes the movement of rod 86, meaning it does not move until gravitational force changes sufficiently. These ridges are typically very small so as to not interfere too much with overall rod motion. However, a variety of heights can be used and those skilled in the art readily understand the principles behind selecting a height depending on the freedom of movement desired for a given application.

Figure 7:
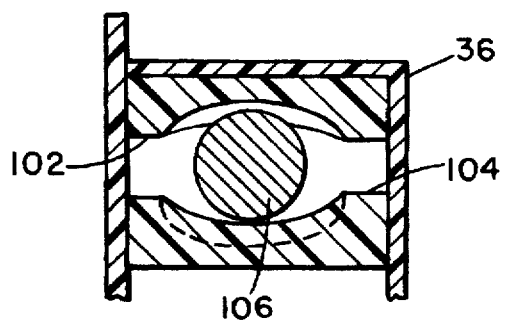
FIG. 7 illustrates an alternate embodiment for the magnetic driver of FIG. 4.

In the alternative, rod 86 can be replaced by a spherical body 106 which is positioned within a track 100. This is illustrated in FIGS. 7 and 9, where sphere 106 is shown positioned to move along a track 100 formed in a set of blocks 102 and 104, which extend across a portion of the handset housing. Track 100 has a curved cross section which can have a radius very close to that of sphere 106. However, it may be simpler to manufacture the blocks with a curve that is slightly larger in radius to assure freedom of motion for sphere 106. Upper and lower track blocks 102 and 104 are manufactured and secured in the handset housing using the techniques discussed above for blocks 92 and 94. Track 100 is formed as circular grooves in the block surfaces that face each other, with the groove in lower block 104 having an arch in one direction and upper block 102 arching in a parallel and mating direction. Sphere 106 can be manufactured using several known techniques. For example, a sphere can be cut or formed from a block of magnetized material, or using magnetized particles or material embedded in a spherical form, such as one formed from a resin, plastic, or ceramic compound.

As before, the force of gravity acts on magnetized sphere 106, as indicated by force arrow 108 in FIG. 9, and it moves or rolls to the lowest position in track 100. This configuration may be harder to manufacture and assemble in terms of forming a spherical groove, machining the circular track, and forming a spherical magnetic driver. Rod shapes for magnetized materials are generally easier to manufacture.

In addition, either rod 86 or sphere 106 tend to move freely within the track when the handset is in the closed or off position. When antenna 16 is secured in a closed position there is minimal interaction between rod 86 and plug 80. However, to decrease rod 86 motion which leads to noise, etc., a small plug 81 can be mounted in an upper portion of antenna module 14 which is positioned near track 90 when antenna 16 is rotated to a closed position. The magnetic attraction for plug 81 and rod 86 should hold the rod in a relatively fixed position near plug 81. The presence of this plug is shown in the perspective view of FIG. 2. Other, more mechanical, means to lock the magnetic actuator in place when the antenna is in a closed position could also be used. In addition, the track can be coated with a material that decreases noise, as desired.

For each of the above embodiments, the ferromagnetic material used for magnetic actuator 17, plug 80, could be replaced with an appropriately dimensioned magnet mounted in antenna module 14, and a body of ferromagnetic material mounted to move freely in tracks 90 or 100 within the handset near the antenna module. In addition, the tracks used for driver 18, could be positioned more interior to the handset directly behind recess 26 wall 35, as desired.

When the portable phone is to be used, a telephone user first releases antenna 16 from recess 32. This could be done by simply grasping a portion of the antenna and rotating it on the antenna module, or using one or more release buttons that press against the antenna or deform the retaining element to release the antenna. At this point, the antenna module is free to rotate about pivot axis 30, and tends to rotate into a position in which the magnetic actuator 17 (plug 80) is lowermost and faces vertically downwards, regardless of the orientation of the handset itself. When the magnetic actuator is oriented downwards under the action of magnetic driver 18 (rod 86, sphere 106) in response to the effects of gravity, the antenna is oriented vertically upwards. This is indicated in FIGS. 2 and 3 for two different orientations of the handset. Thus, after the user releases the antenna and moves the handset into an appropriate position with speaker 22 adjacent one ear, such as the position illustrated in FIG. 2, magnetic actuator 17 rotates module 14 in an anti-clockwise direction partially out of recess 32, and the antenna is vertically oriented. Since the pivot axis extends in a direction transverse to the plane of speaker 22, it will be oriented more or less horizontally regardless of the orientation of the handset, since the handset must be oriented with the speaker more or less vertical for use.

If the handset is angled in the opposite direction, for example to place it against the opposite ear of a user, as illustrated in FIG. 3, module 14 rotates in the opposite, clockwise direction out of recess 26 so that the magnetic actuator is again facing downwards and the antenna is directed vertically upwards. Thus, this arrangement allows for automatic vertical correction of the antenna pointing direction with movement as the phone is rotated through useful angles with the pivot joint and axis maintained closely horizontal.

When the handset is oriented vertically, the antenna module rotates until it is completely within recess 26 with lower wall 44 of the module positioned adjacent to lower wall 36 of the recess and upper wall 42 aligned with handset upper wall 38. The shape of the module upper and lower walls are such that, when the module is rotated into an inoperative, stored position, as shown in FIG. 1, upper wall 42 of the module is positioned adjacent to lower wall 36 of the recess. The shape of upper wall 42 is such that it matches the shape of lower wall 36 of the recess when rotated into the stored position. Although the upper and lower walls of the module and the lower wall of the recess are each only partially curved in the illustrated embodiment, these walls may alternatively be continuously curved surfaces, or spaced apart flat surfaces.

An alternative antenna structure which could also take advantage of the features of the present invention is illustrated in a back perspective view in FIG. 10 and an enlarged sectional view in FIG. 11. In FIG. 10, the phone and antenna electronic components are mounted inside of the handset housing, and an antenna 110 is mounted in a rotary antenna support module 112 that is generally smaller than that used for previous embodiments. Antenna support module 112 is mounted to rotate freely on a recessed portion 116 of a rear wall 115 of a telephone handset 12', using a support bearing or pivot pin structure 70' similar to that described above for bearing assembly 70. However, a variety of known rotary support structures can be employed for this function. This mounting allows antenna support module 112 to rotate freely and antenna 110 to assume and maintain a vertical orientation when a magnetic actuator plug 114 is driven downward.

A dashed line in FIG. 10 illustrates that a housing or cover 118 can be used to enclose a major portion of the antenna, if desired, leaving only a slot for the antenna to extend through. This housing can also be viewed as an extension of the handset housing which is made removable for mounting antenna 110 and antenna support module 112 in place during phone manufacturing.

In this configuration, magnetic actuator 17' is formed by mounting a magnetic rod or plug 114 on the bottom or lower portion of antenna support module 112, inside a cavity or recess 120, as shown in FIG. 11. This is accomplished in this example by providing threaded sidewall portions 122 for recess 120, and matching threads 124 on the end of plug 114. A tool interface slot 126 is also provided to assist in rotating and securing plug 114 in place.

A magnetic driver 18' is positioned inside rear wall 115 of handset 12' behind recess 116 and antenna support module 112. Magnetic driver 18' uses arcuate track 130 to guide a magnetized rod 132 which moves in the track under the influence of gravity. Track 130 and rod 132 are constructed in a similar manner to track 90 and rod 86, or track 100 and sphere 106, described above. Track 130 can be formed from two blocks as shown above, or a single block 134, as desired. These blocks are mounted inside handset 12' near the back wall 135 of recess 116 in this embodiment. However, as mentioned previously, the track can be positioned below antenna support module 112 as well.

Using the invention, the magnetic driver constantly seeks gravity, ensuring proper orientation of the antenna and reducing the risk of signal loss as the result of a user improperly positioning the antenna, or repositioning the handset during use. The user does not have to worry about positioning the antenna, since it positions itself automatically in a vertically upright position when released from recess 32. An unsophisticated user may be unaware of the potential power loss involved in improper antenna positioning or repositioning during use. This does not require input from the user as regards initial antenna orientation or maintenance of proper antenna orientation during use.

Since the invention assures that the antenna or antennas have a reasonably vertical orientation, the radiation pattern used can be optimized to have a more vertical pattern. This results in more efficient signal energy transfer and improved communication system performance.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. For example, this technique is useful for other advanced non-satellite wireless systems as well where a more efficient antenna transfer is desired. Thus, the present invention is not intended to be limited to the embodiments shown herein but is to be accorded the widest scope consistent with the principles and novel features disclosed herein.

What I claim is:

1. A portable telephone unit, comprising:

a portable telephone handset;

an antenna module pivotally secured to the handset with a pivot joint for rotation relative to the handset about a predefined pivot axis;

magnetic driving means for urging the antenna module to rotate relative to the handset into a predetermined vertical orientation independent of handset orientation, said magnetic driving means being responsive to gravitational forces to select said vertical orientation; and an antenna projecting along a direction from the module oriented vertically when said module is in said predetermined orientation.

2. The unit of claim 1 wherein said magnetic driving means comprises:

a ferromagnetic material secured to said antenna module on a side opposite said antenna; and a magnetized driver mounted in said handset adjacent said antenna module so that it moves under the influence of gravity to seek a lowest position, said driver producing a magnetic field sufficient to attract said ferromagnetic material over a predetermined range of travel for said driver and rotation for said antenna module.

3. The unit of claim 2 wherein said ferromagnetic material comprises a cylindrical plug mounted in a recess within said antenna module.

4. The unit of claim 1 wherein the module has an upper wall and a lower wall, with side walls connected therebetween, the lower wall having a recess, the magnetic driver comprising a solid block of metal mounted in said lower wall recess, and the antenna extending from said upper wall.

5. The unit of claim 2 wherein said magnetized driver comprises:

a guidance track mounted in said handset extending across a portion of said handset between sidewalls thereof in an arcuate shape around said pivot axis; and a magnetized body enclosed within said track while being substantially freely movable along the arcuate path of said track under the influence of gravity.

6. The unit of claim 5 wherein said body is a magnetized cylindrical shaped body and said track has a rectangular cross section with dimensions slightly larger than said magnetized body to allow unimpeded movement by rolling along the arcuate path of said track.

7. The unit of claim 6 wherein said track comprises a surface having a plurality of spaced apart ridges for impeding the movement of said body until gravitational force redirects body movement over the impeding ridge, for quantizing motion of said magnetized body.

8. The unit of claim 5 wherein said body is a magnetized spherical shaped body and said track has a circular cross section with dimensions slightly larger than said magnetized body to allow unimpeded movement.

9. The unit of claim 3 wherein said ferromagnetic material comprises material selected from the group of steel and nickel.

10. The unit of claim 1 wherein the handset has a recess of predetermined shape and dimensions, and the module is of a shape and dimensions substantially matching those of the recess, the module being pivotally secured in said recess.

11. The unit of claim 10 wherein the handset has a front wall in which a microphone and speaker are located, and a rear wall, the recess being in the rear wall of the handset.

12. The unit of claim 10 wherein the handset has spaced side walls, an upper wall and a lower wall, and the recess comprises a two-sided cut out extending inwardly from the upper end wall and rear wall, the recess having an inner, flat wall extending downwardly from said upper wall and a lower end wall extending outwardly from said inner wall to the rear wall.

13. The unit of claim 10 wherein the recess and module have opposing inner walls, and the pivot joint extends between said inner walls for pivotally connecting the antenna module to the handset.

14. The unit of claim 13 wherein the recess has at least one end wall which is at least partially curved, and the module has a first peripheral wall of shape matching that of said recess end wall.

15. The unit of claim 1 wherein the antenna module is rotatable about said pivot axis from an inoperative, stored position in which the antenna is located alongside said handset into any orientation relative to said handset depending on the handset orientation.

16. The unit of claim 15 including releasable locking means for releasably securing said antenna and module in said stored position.

17. The unit of claim 15 wherein the handset has a recess for receiving said antenna in said stored position.

18. The unit of claim 1 wherein the handset and module each have an internal cavity and the pivot joint has a through bore connecting the internal cavities of the handset and antenna module together, a first set of electronic components being mounted in the handset cavity and a second set of electronic components being mounted in the antenna cavity, and a connecting cable extends through said bore between the two sets of components.

19. The unit as claimed in claim 1, wherein said antenna module comprises damping means coupled to said pivot joint for restricting rapid rotation of said antenna.

* * * * *